United States Patent [19]

Shive et al.

[11] Patent Number: 5,622,568
[45] Date of Patent: Apr. 22, 1997

[54] GETTERING OF METALS FROM SOLUTION

[75] Inventors: Larry W. Shive, St. Peters; Saeed Pirooz, St. Louis, both of Mo.

[73] Assignee: MEMC Electronic Materials, Inc., St. Peters, Mo.

[21] Appl. No.: 259,052

[22] Filed: Jun. 13, 1994

[51] Int. Cl.⁶ .................................................... C02F 1/42
[52] U.S. Cl. .................................. 134/2; 134/3; 210/688
[58] Field of Search .......................... 134/2, 3; 210/506, 210/688, 807, 196, 263, 912; 252/181.6

[56] References Cited

U.S. PATENT DOCUMENTS

| | | | |
|---|---|---|---|
| 4,256,587 | 3/1981 | Carnahan et al. | 210/670 |
| 4,337,555 | 7/1982 | Hancock et al. | 423/6 |
| 4,687,573 | 8/1987 | Miller et al. | 210/506 |
| 4,687,581 | 8/1987 | Macedo et al. | 210/670 |
| 4,902,426 | 2/1990 | Macedo et al. | 210/688 |
| 5,164,093 | 11/1992 | Chilton et al. | 210/688 |
| 5,175,110 | 12/1992 | Bradshaw et al. | 210/688 |
| 5,178,768 | 1/1993 | White, Jr. | 210/663 |
| 5,286,464 | 2/1994 | Dragisich | 210/688 |
| 5,405,535 | 4/1995 | Yamamoto | 210/669 |

FOREIGN PATENT DOCUMENTS

| | | |
|---|---|---|
| 0306334 | 3/1989 | European Pat. Off. . |
| 61-222592 | 10/1986 | Japan . |

OTHER PUBLICATIONS

Bruening et al. "Effect of Organic Solvent and Anion Type on Cation Binding Constants with Silica Gel Bound Macrocycles and Their Use in Designing Selective Concentrator Columns" Analytical Chemistry, vol. 63, No. 1 (Jan. 1991) pp. 21–24.

R. Kocjan "Additional Purification of Some Salts by Using Silica Gel Modified with Calmagit as a Sorbent" Separation Science & Technology, vol. 27, No. 3 (Dec. 1992) pp. 409–417.

R. Kocjan et al. "Calcon–Modified Silica Gel Sorbent. Application to Preconcentration or Elimination of Trace Metals" Talanta, vol. 39, No. 1 (Dec. 1992) pp. 63–68.

Phelan et al. "Combined Reagent Purification and Sample Dissolution (CORPAD) Applied to the Trace Analysis of Silicon, Silica and Quartz" Analyst, vol. 109 (Oct. 1984) pp. 1269–1272.

Primary Examiner—Scott Kastler
Attorney, Agent, or Firm—Senniger, Powers, Leavitt & Roedel

[57] ABSTRACT

A process and a gettering agent for gettering metals from a solution. In the process, the solution is contacted with a gettering agent having a surface layer of $SiO_2$, the layer of $SiO_2$ preferably being greater than 15 angstroms in thickness.

13 Claims, 2 Drawing Sheets

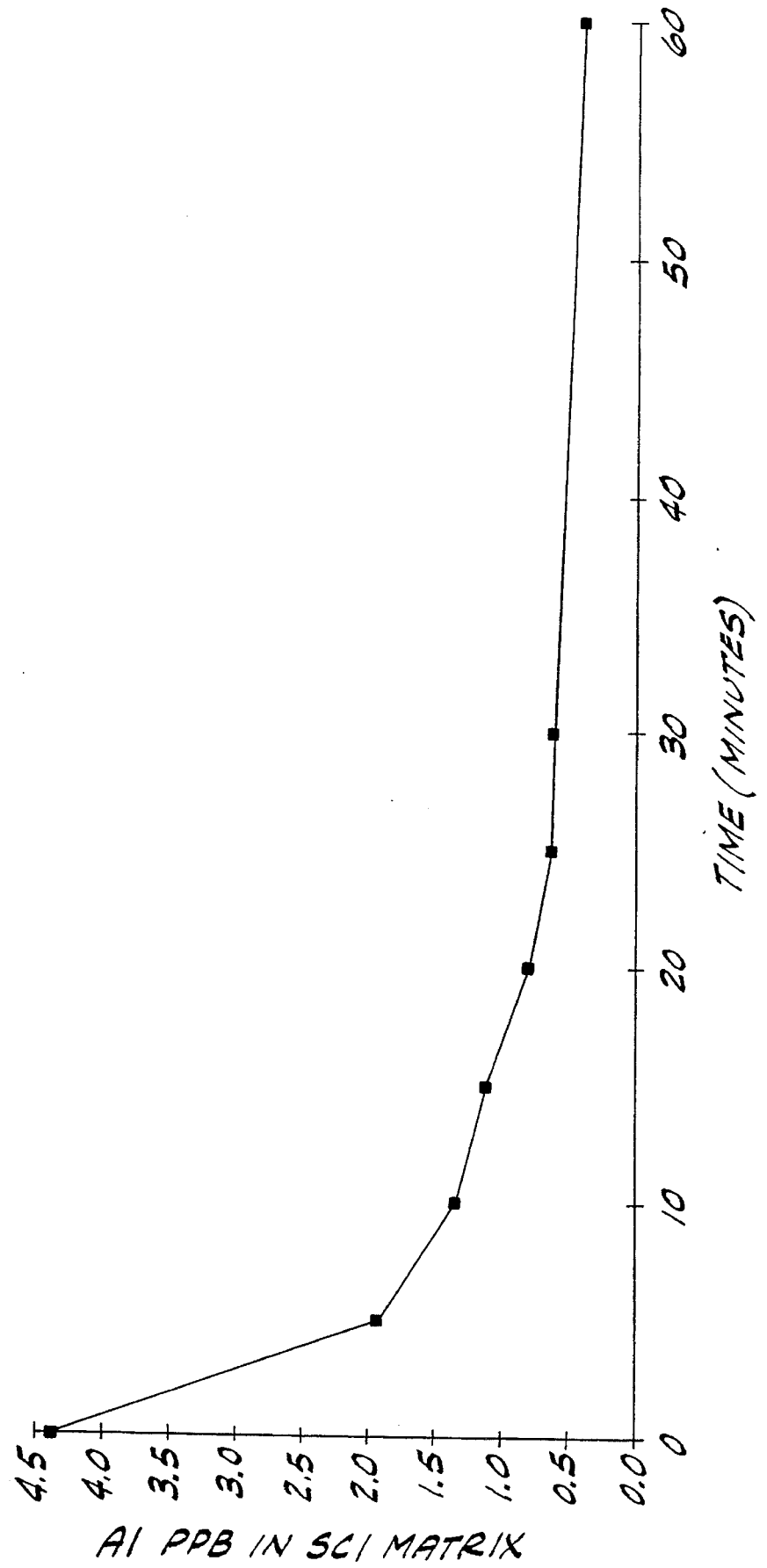

GETTERING OF METALS FROM SOLUTION

BACKGROUND OF THE INVENTION

The present invention relates to the gettering of metals from a solution, and in particular, to the gettering of metals from an alkaline solution such as a semiconductor wafer cleaning solution.

The preparation of single crystal silicon wafers typically involves the steps of growing a single crystal ingot, slicing the ingot into wafers, and lapping, etching and polishing the wafers. Prior to being packaged for delivery to a customer, the polished wafers are routinely cleaned by a procedure commonly known as the RCA method developed by Kern. See W. Kern and D. Puotinen, RCA Rev. 31 (1970) 187. In this method the wafers are immersed in a series of alkaline and acidic baths. One of the alkaline baths ("SC-1") typically contains $H_2O$—$H_2O_2$—$NH_4OH$ and one of the acidic baths ("SC-2") typically contains $H_2O$—$H_2O_2$—$HCl$. SC-1 which may range from about 1000:1:1 to 1:1:1 parts by volume $H_2O:H_2O_2:NH_4OH$, removes organic contaminants and particles by both the solvating action of ammonium hydroxide and the powerful oxidizing action of hydrogen peroxide. The ammonium hydroxide also serves to complex metals such as copper, gold, nickel, cobalt, zinc and calcium. SC-2 which may range from about 1000:1:1 to 1:1:1 parts by volume $H_2O:H_2O_2:HCl$, removes alkali and transition metals, and prevents redeposition from the solution by forming soluble metal complexes. F. Shimura, *Semiconductor Silicon Crystal Technology* (Academic Press; London, England; 1989), page 189.

Although the RCA method is relatively effective for cleaning particles from the surfaces of wafers, it is not without its disadvantages; SC-1 has been identified as a source of metal contamination. Silicon wafers bathed in a SC-1 cleaning bath prepared from ultrapure solutions typically have a surface contamination of about $1\times10^{10}$ to about $1000\times10^{10}$ metal atoms per square centimeter when the cleaning bath is fresh and the surface contamination will progressively increase as the number of wafers bathed in the cleaning bath increases. For this reason, SC-2 cleaning traditionally follows SC-1 cleaning but has proven to be only marginally efficient for removing Al and Fe. Significantly, however, current leading edge applications of silicon wafers require that the total of all surface metals be less than $1\times10^{10}$ atoms per square centimeter. The present invention enables such metal contamination levels to be achieved.

SUMMARY OF THE INVENTION

Among the objects of the invention, therefore, may be noted the provision of a process and composition for gettering metals from an alkaline solution, and the provision of a process and apparatus for cleaning particles from the surface of a silicon wafer in which surface contamination with metals is reduced.

Briefly, therefore, the present invention is directed to a process for cleaning particles from the surface of a silicon wafer in which the silicon wafer is contacted with a cleaning solution. Metals are continuously gettered from the cleaning solution by contacting the cleaning solution with a bed of a gettering agent, the gettering agent having a surface layer of silicon dioxide.

The present invention is also directed to a process for gettering metals from a solution. In the process, the solution is contacted with a gettering agent having a surface layer of $SiO_2$, the layer of $SiO_2$ being greater than 15 angstroms in thickness and having less than about $5\times10^{16}$ atoms/cm$^2$ of each of aluminum, titanium, boron, calcium, zinc, and iron on its surface in various oxidation states.

The present invention is further directed to a gettering agent for gettering metals from a solution. The gettering agent comprises a granule of silicon having a size greater than about 0.01 millimeter and less than 10 millimeter in diameter, a surface concentration of less than about $5\times10^{16}$ atoms/cm$^2$ of each of aluminum, titanium, boron, calcium, zinc, and iron in various oxidation states and a bulk concentration of less than 10 parts per billion weight/weight ratio (ppbw) of each of Al, Ti, B, Ca, Zn, and Fe. The silicon granule additionally has a surface layer of $SiO_2$ greater than 15 angstroms in thickness.

The present invention is further directed to an apparatus for cleaning particles from the surface of a silicon wafer. The apparatus includes a tank for containing a volume of a cleaning solution and into which the silicon wafer is immersed, a porous bed of a gettering agent having a surface layer of $SiO_2$ greater than 15 angstroms in thickness, and recirculation means for withdrawing a quantity of cleaning solution from the tank.

Other objects of the invention will be in part apparent and in part pointed out hereinafter.

BRIEF DESCRIPTION OF THE DRAWINGS

FIG. 3 is a graph showing total aluminum content as a function of time for a solution being contacted with a gettering agent of the present invention as set forth in the Example.

DETAILED DESCRIPTION OF THE PREFERRED EMBODIMENTS

Surprisingly, it has been discovered that the metal content of SC-1 and other alkaline solutions may be reduced by contacting the solution with a bed of a gettering agent which has a surface layer of $SiO_2$. Advantageously, therefore, the metal content of SC-1 and other alkaline semiconductor wafer cleaning solutions may be reduced to less than 10 parts per trillion (atomic) thereby enabling the preparation of cleaned silicon wafers having less than $1\times10^{10}$ metal atoms per square centimeter on the surface thereof. The metal content of other alkaline solutions such as $NaOH:H_2O_2$, $KOH:H_2O_2$, choline:$H_2O_2$, and $(CH_3)_4NOH:H_2O_2$ may also be reduced in accordance with the present invention.

The process of the present invention may be used to getter any metal which is capable of forming a minimum of two covalent bonds from an alkaline solution. Such metals include iron, aluminum, calcium, titanium, and boron which are capable of building "networks" in silicon dioxide and thus, degrading the electrical characteristics of the silicon dioxide. Metals such as sodium and potassium which form purely ionic bonds to silica will not be gettered.

Figure 1:
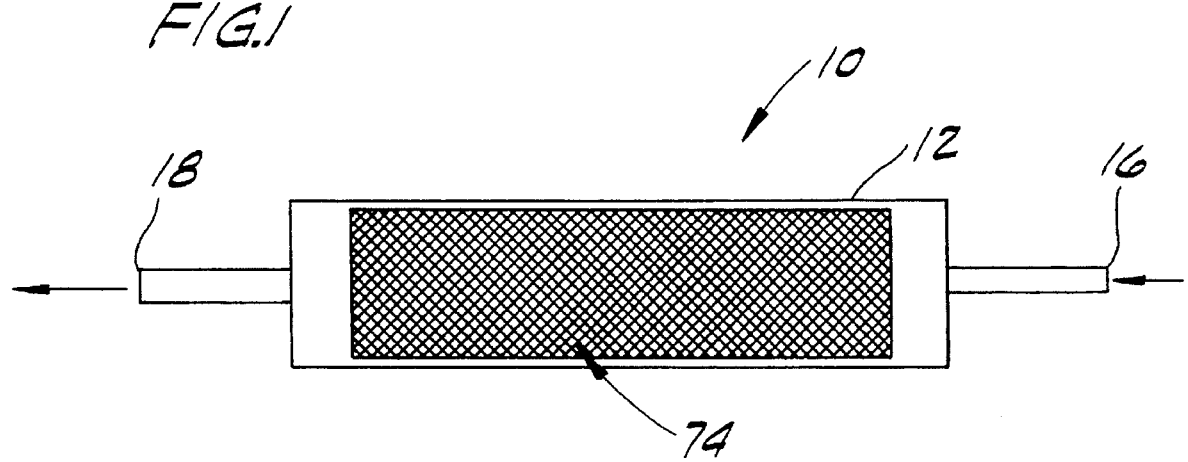
FIG. 1 is a schematic of an apparatus for gettering metals from a solution in accordance with the present invention.

Referring now to FIG. 1, a gettering device 10 of the present invention for removing metals from an alkaline solution has a housing 12 which contains a bed of gettering agent 14. The solution to be purified enters the gettering device through inlet 16, flows through the bed of gettering agent 14 and exits the gettering device through outlet 18. The housing is preferably made of a non-contaminating material such as polyethylene, a fluorinated resin sold under the trade designation Teflon by Dupont (Wilmington, Del.), polyvinylidinedifluoride ("PVDF"), or quartz. In addition, the gettering device should not be a source of particles that cannot be filtered or that would clog standard liquid particle filters that remove particles having a diameter as small as 0.01 micrometers.

For many applications such as the purification of a chemical reagent prior to use, it will only be necessary to pass the reagent through the gettering device 10 in a single pass. For other applications, however, such as the purification of a cleaning solution held in a silicon wafer cleaning tank, it is desirable to continuously purify the cleaning solution.

The gettering agent should be mechanically stable and of a size and shape that will provide a well-defined residence time and a uniform flow of solution across the cross-section of the bed of gettering agent without a significant pressure drop across the gettering device. Preferably, the gettering agent comprises a chunk or granule of silicon which is greater than about 0.01 millimeter and less than about 10 millimeter in diameter and, more preferably greater than about 0.1 millimeter and less than about 10 millimeter in diameter. As used herein, particle diameters (sizes) are determined by commercially available standard mechanical sieves and macrofiltration screens. For example, particles greater than 4 millimeter can be captured on a U.S. Standard 4 millimeter sieve while smaller particles would pass through. In the same way, particles greater than 0.105 millimeter would be captured on a 105 micron mesh macrofiltration screen. In addition, the surface area to weight ratio of the gettering agent is between about 0.001 $m^2$ per gram and about 10 $m^2$ per gram, preferably between about 0.05 $m^2$ per gram and about 1 $m^2$ per gram.

Silicon dioxide reacts with aqueous ammonia (frequently referred to as $NH_4OH$) to form ammonium silicate. For example, the maximum etch rate is approximately 0.1 angstroms per minute in a conventional SC-1 solution at room temperature. Over time, therefore, alkaline solutions such as SC-1 will completely dissolve the native silicon dioxide and, if the silicon dioxide is on the surface of free-flowing granular semiconductor grade polysilicon, it may eventually cause the disintegration of granular polysilicon. Accordingly, the $SiO_2$ surface layer preferably should have a thickness which is greater than that of the native oxide which forms on silicon during oxidation in air or during chemical oxidation in oxidizing reagents such as $H_2SO_4/H_2O_2$ mixtures, $H_2SO_4/HNO_3$ mixtures, $NH_4OH/H_2O_2$ mixtures and gaseous or aqueous ozone (about 5–15 angstroms) to strike a balance between gettering capability and oxide dissolution. More preferably, the oxide thickness is between 15 angstroms and 5,000 angstroms and is most preferably about 1000 angstroms.

So that the gettering agent is not itself a source of contamination, the gettering agent should have a relatively low concentration of metals. That is, the gettering agent should contain no more than about 10 parts per billion weight/weight ratio (ppbw) of aluminum, titanium, boron, calcium, zinc and iron and collectively no more than about 60 ppbw of these metals. Preferably, the surface of the gettering agent contains less than about $5\times10^{16}$ atoms/$cm^2$ of each of these metals and collectively no more than about $30\times10^{16}$ atoms/$cm^2$ of these metals. More preferably, the gettering agent comprises semiconductor grade polycrystalline silicon which contains less than about $2\times10^{16}$ atoms/$cm^2$ of each metal and collectively no more than about $12\times10^{16}$ atoms/$cm^2$ of these metals.

The surface layer of silicon dioxide may be grown, for example, by exposing polycrystalline silicon to an oxygen-containing atmosphere, such as pure oxygen, oxygen/hydrogen mixtures, or oxygen and an inert gas such as nitrogen, helium, or argon, at a temperature in the range of about 900° C. to about 1300° C. Preferably, the oxide is grown by exposing the polycrystalline silicon to an atmosphere of about 40% oxygen by volume and about 60% hydrogen at a temperature of about 1100° C. for about 2–4 hours.

In a particularly preferred embodiment, the gettering agent has a size between about 0.01 millimeters and 0.5 millimeters and is a free-flowing, granular semiconductor grade polysilicon having a surface layer of silicon dioxide. Free-flowing, granular polysilicon of this size may be prepared, for example, from tiny silicon seed particles which are fluidized in a monosilane/hydrogen mix. See, e.g., F. Shimura, *Semiconductor Silicon Crystal Technology* (Academic Press; London, England; 1989), page 120 and the references cited therein. Alternatively, free-flowing granular polysilicon of this size is commercially available from Ethyl Corporation (Baton Rouge, La.) and from Texas Instruments (Dallas, Tex.). Polysilicon from Ethyl Corporation typically has a size range from 0.12 millimeter to 2.5 millimeter with an average of about 0.8 mm. The density is about 1.5 grams/cc and the free space volume is about 35%. The average surface area per gram is about 0.1 $m^2$/g. Typical metal concentration is less than 5 ppbw for aluminum, titanium, boron, calcium, zinc and iron and most frequently less than 2 ppbw per metal. Surface metals are typically less than $5\times10^{16}$ atoms/$cm^2$ of each metal and most frequently less than $2\times10^{16}$ atoms/$cm^2$ of each metal.

Figure 2:
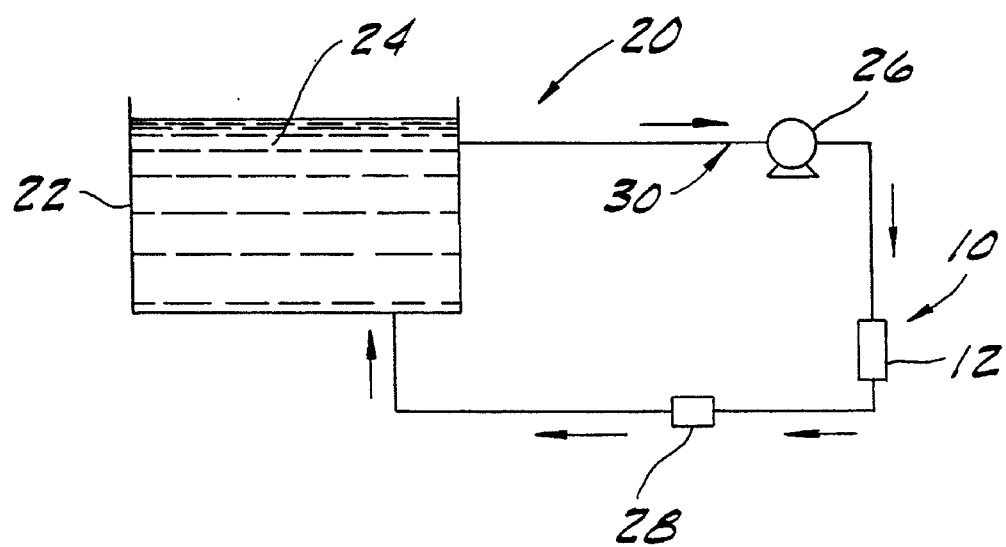
FIG. 2 is a schematic of an apparatus for cleaning particles from the surface of a silicon wafer in accordance with the present invention.

Referring to FIG. 2, an apparatus for continuous purification of a solution held in a tank is schematically depicted. All materials of construction, like those of the gettering device 10, should be non-contaminating. The apparatus, generally designated by reference numeral 20, includes a tank 22 for the solution 24. The apparatus additionally includes a recirculation loop which comprises pump 26, gettering device 10 and filter 28 connected by tubing 30. Upon the energization of pump 26, solution 24 is withdrawn from tank 26, caused to flow in the direction of the arrows through gettering device 10 and filter 28 and returned to tank 24.

In a preferred embodiment of the silicon wafer cleaning operation, a cassette or cassettes holding a plurality of wafers, e.g., 100 wafers, is immersed into a cleaning tank which contains approximately 2 to 80 liters of a flowing SC-1 cleaning solution. The SC-1 cleaning solution contains about 1000:1:1 to 1:1:1 parts by volume $H_2O:H_2O_2:NH_4OH$, preferably about 100:1:1 to about 5:1:1 parts by volume $H_2O:H_2O_2:NH_4OH$, (supplied as 30–35 wt % $H_2O_2$ in water and 28–30 wt % $NH_4OH$ in water) and has a temperature of about 0° C. to about 100° C., preferably about 25° C. to 90° C. Metals are gettered from the cleaning solution by withdrawing the SC-1 cleaning solution at a rate of approximately 0.4 liters per minute to 40 liters per minute, preferably about 7–22 liters per minute. The withdrawn solution is caused to flow through a gettering device which contains about 10 milliliters to about 10 liters, preferably about 1 liter of free-flowing, granular semiconductor grade polysilicon which has a surface layer of silicon dioxide, preferably about 1000 Å grown thereon; the flow rate of SC-1 through the gettering device should be sufficient to maintain the total concentration of SC-1 cleaning solution in the tank of aluminum, titanium, boron, calcium, zinc and iron of less than 100 parts per trillion by weight to volume ratio (ppt) each, preferably less than 10 ppt. Before being returned to the cleaning tank, SC-1 cleaning solution exiting the gettering device is filtered using, for example, a Pall Super Cheminert™ all-Teflon fluorocarbon filter which is rated to remove greater than 90% of all particles larger than 0.10 millimeter diameter from heated SC-1 mixtures. To minimize clogging of the filter, the gettering device should contain a minimum of gettering agent particles having a size of less than about 0.1 micrometers.

Methods for determining the metal content of alkaline solutions such as SC-1 and for determining the surface and bulk metal contamination of silicon are well known to those of ordinary skill. For example, the metal content of solutions may be determined as set forth in Marshall, J., Carroll, J., Crighton, J., and Barnard, C. L>R., *J. of Anal. Atomic Spec.*, 8, 337R (1993), the surface metal content of silicon may be determined as set forth in Ruth, K., Schmidt, P., Coria, J., and Mori, E., *Proceedings of the ESC Fall Meeting*, Electrochemical Society 1993 (Vol. II) p. 488, and the bulk metal content of silicon may be determined as set forth in Chu, C. C., Chen, P. Y., Yang, M. H., and Alfassi, Z., *Analyst*, 115, 29 (1990), the disclosures of which are incorporated herein by reference.

The following Example illustrates the invention.

EXAMPLE

A solution of 1:4:20 $NH_4OH:H_2O_2:H_2O$ was intentionally contaminated with more than 4 ppb(w/v) of aluminum using a standard aluminum solution. This solution was contacted with a fixed bed of air-oxidized polysilicon granules (Ethyl Corporation) having a size range from 0.12 millimeter to 2.5 millimeter with an average of about 0.8 millimeter. Samples of the solution were pulled on a periodic basis to determine the about of total aluminum (dissolved plus suspended) remaining in the SC-1 mixture. FIG. 3 shows total aluminum content as a function of time. Aluminum content decreased to 1/10th its original value in less than 60 minutes.

While certain representative embodiments and details have been shown for the purpose of describing the invention, it will be apparent to those skilled in the art that various changes and modifications may be made therein without departing from the scope of the invention.

What is claimed is:

1. A process for cleaning particles from a surface of a semiconductor wafer with an alkaline cleaning solution comprising growing a surface layer of silicon dioxide on polycrystalline silicon by exposing the polycrystalline silicon to an oxygen-containing atmosphere at a temperature in the range of about 900° C. to about 1300° C., the surface layer being grown to a thickness which is greater than the thickness of the native oxide which forms on silicon during oxidation in air;

contacting the cleaning solution with a bed comprising the polycrystalline silicon onto which the surface layer of silicon dioxide has been grown; and immersing the wafer in the cleaning solution.

2. A process as set forth in claim 1 wherein the cleaning solution contains water, hydrogen peroxide and ammonium hydroxide.

3. A process as set forth in claim 1 wherein the polycrystalline silicon has a surface layer of $SiO_2$ having a thickness of about 1,000 angstroms.

4. A process as set forth in claim 1 wherein the cleaning solution is held by a tank and the cleaning solution is continuously withdrawn from the tank, passed through the bed comprising the polycrystalline silicon, and returned to the tank as the semiconductor wafer is immersed in the cleaning solution.

5. A process as set forth in claim 1 wherein the polycrystalline silicon has no more than about $30 \times 10^{16}$ atoms/cm² of aluminum, titanium, boron, calcium, zinc, and iron on its surface.

6. A process for cleaning particles from a surface of a semiconductor wafer with an alkaline cleaning solution comprising contacting the cleaning solution with a bed comprising a gettering agent, the gettering agent having a surface layer consisting essentially of silicon dioxide which has been formed by growing a silicon dioxide layer on the surface of free-flowing granular polycrystalline silicon, the surface layer having a thickness which is greater than the thickness of the native oxide which forms on silicon during oxidation in air; and immersing the wafer in the cleaning solution.

7. A process as set forth in claim 6 wherein the cleaning solution contains water, hydrogen peroxide and ammonium hydroxide.

8. A process as set forth in claim 6 wherein the cleaning solution contains water, hydrogen peroxide, and ammonium hydroxide and the gettering agent is a granule of polycrystalline silicon having a surface layer consisting essentially of silicon dioxide and a size greater than about 0.01 millimeter and less than about 10 millimeter in diameter, the surface layer having a thickness which is greater than the thickness of the native oxide which forms on silicon during oxidation in air.

9. A process as set forth in claim 6 wherein the gettering agent has no more than about $30 \times 10^{16}$ atoms/cm² of aluminum, titanium, boron, calcium, zinc, and iron on its surface.

10. A process as set forth in claim 6 wherein the cleaning solution is held by a tank and the cleaning solution is continuously withdrawn from the tank, passed through the bed comprising the gettering agent, and returned to the tank as the semiconductor wafer is immersed in the cleaning solution.

11. A process as set forth in claim 10 wherein the tank is made of quartz.

12. A process as set forth in claim 6 wherein the metal content in the cleaning solution is reduced to less than 10 atomic parts per trillion.

13. A process as set forth in claim 6 wherein the metal content on the surface of the semiconductor wafer is reduced to less than $1 \times 10^{10}$ metal atoms per square centimeter.

* * * * *